United States Patent
Howson

(10) Patent No.: US 7,978,199 B2
(45) Date of Patent: Jul. 12, 2011

(54) PARAMETER COMPACTION IN TILE BASED RENDERING DEVICE

(75) Inventor: John Howson, Hertfordshire (GB)

(73) Assignee: Imagination Technologies Limited, Hertfordshire (GB)

( * ) Notice: Subject to any disclaimer, the term of this patent is extended or adjusted under 35 U.S.C. 154(b) by 965 days.

(21) Appl. No.: 11/811,871

(22) Filed: Jun. 12, 2007

(65) Prior Publication Data

US 2008/0007560 A1      Jan. 10, 2008

(51) Int. Cl.
G06F 12/06      (2006.01)

(52) U.S. Cl. ........................................................ 345/543

(58) Field of Classification Search .................... 345/543
See application file for complete search history.

(56) References Cited

U.S. PATENT DOCUMENTS

| | | | | |
|---|---|---|---|---|
| 5,295,235 | A | * | 3/1994 | Newman ........................ 345/619 |
| 5,392,385 | A | * | 2/1995 | Evangelisti et al. ........... 345/611 |
| 5,522,018 | A | * | 5/1996 | Takeda et al. .................. 345/422 |
| 5,729,672 | A | * | 3/1998 | Ashton ........................... 345/589 |
| 5,886,701 | A | * | 3/1999 | Chauvin et al. ............... 345/418 |
| 2002/0039100 | A1 | | 4/2002 | Morphet |
| 2008/0007560 | A1 | * | 1/2008 | Howson ........................ 345/531 |

FOREIGN PATENT DOCUMENTS

| | | | |
|---|---|---|---|
| EP | 1 351 195 A3 | | 10/2003 |
| GB | 2 378 108 A | | 1/2003 |
| GB | 2378108 A | * | 1/2003 |
| GB | 2 404 316 A | | 1/2005 |
| GB | 2404316 A | * | 1/2005 |
| WO | WO01/95257 A | | 12/2001 |

OTHER PUBLICATIONS

European Search Report dated Sep. 25, 2006 (3 pages).
International Search Report and Written Opinion of the International Searching Authority, mailed Sep. 18, 2007 (11 sheets).
"ZR: A 3D API Transparent Technology for Chunk Rendering" Emile Hsieh, et al., 2001, (8 pages).

* cited by examiner

Primary Examiner — Javid A Amini
(74) Attorney, Agent, or Firm — Flynn, Thiel, Boutell & Tanis, P.C.

(57) ABSTRACT

A method and apparatus for managing memory usage for three-dimensional computer graphics systems are provided. A scene which is textured and shaded in the system is divided into a plurality of rectangular areas, each including a plurality of picture elements in the scene. For each rectangular area a list of objects which may be visible in the scene is derived. Objects which do not contribute to the final textured and shaded scene are then removed from each list and the rectangular area is then textured and shaded using reduced lists of objects.

9 Claims, 6 Drawing Sheets

Block diagram of a til based rendering system

Flow chart of basic operation

Processing of a macro tile

Block diagram of preferred embodiment

PARAMETER COMPACTION IN TILE BASED RENDERING DEVICE

FIELD OF THE INVENTION

This invention relates to a 3-dimensional computer graphics system and in particular to methods and apparatus that reduce the amount of intermediate data stored in a tile based rendering system.

BACKGROUND OF THE INVENTION

Tile based rendering systems are known. These break down an image to be rendered into a plurality of rectangular blocks or tiles. The way in which this is done and the subsequent texturing and shading performed is shown schematically in FIG. 1. This shows a geometry-processing unit 2 that receives the image data from an application and transforms it into screen space using a well-known method. The data is then supplied to a tiling unit 4, which inserts the screen space geometry into lists for a set of defined rectangular regions, or tiles, 6. Each list contains primitives that exist wholly or partially in a sub-region of a screen (i.e. a tile). A list exists for every tile on the screen, although it should be borne in mind that some lists may have no data in them.

Data then passes tile by tile to a hidden surface removal unit 8 (HSR) which determines the visibility of each object by comparing the depth at each pixel in the object with the value currently stored in the depth buffer 14. If a pixel is determined to be visible the depth buffer is updated and the object tag passed to the pass spawn control unit 10 (PSCU). The PSCU updates the tag buffer 12 with visible tags from each object and passes them to the texturing and shading unit 16 (TSU) when it determines that a pass must be "spawned". A pass is typically spawned when the PSCU attempts to write a tag for a translucent object into a tag buffer location that is already occupied. For a detailed description of the pass spawning process refer to patent 46009.GB01

The presence of the screen space geometry lists imposes an overhead on tile based rendering systems (TBR) that is not required in conventional immediate mode rendering (IMR) architectures. This overheard is typically dealt with by rendering the current scene and freeing the parameter memory used for subsequent primitives. This method has the disadvantage of requiring memory to be allocated for a full sized Z buffer in external memory. Further to this, if anti-aliasing is being applied to the scene then both the Z buffer and target render surfaces have to be at the full anti-aliased resolution i.e. if the scene is being rendered with 4× anti-aliasing with a target resolution of 512×512 then the Z and target surfaces must be allocated for 1024×1024 resolution. The use of high precision intermediate render targets that could otherwise remain on chip further compounds this problem. The net result is that one of the key advantages of a TBR system is removed by this approach.

The above approach also means that the entire memory used by a scene cannot be freed until it has been entirely rendered. This means that the system must either stall when waiting for a scene to complete or only allow half the memory resource be used in a single render so that tiling can continue during a render.

This situation is improved by a technique know as 'Macro Tiling' in which the screen is subdivided into a plurality of tiles which are then treated as rectangular groups of tiles or macro tiles. Object data is pointed to in per tile geometry lists as per normal tiling, however instead of a single 'global' list of objects each macro tile is given its own macro list. This allows memory to be allocated and freed on a macro tile granularity e.g. when all parameter space has been consumed, macro tiles are rendered to enable memory to be freed as opposed to rendering the whole scene. This mechanism minimises the amount of time the tiling and geometry processing hardware remains idle for in these circumstances, however it retains the same need for high resolution/precision Z and render target buffers to be allocated as above.

SUMMARY OF THE INVENTION

As tiling is applied to all geometry prior to visibility testing it is evident that the tiled lists will contain data that is not required for the correct rasterisation of the 3D scene. For example if a scene is composed entirely of opaque objects then only the frontmost visible objects need to be retained in the parameter buffer in order to correctly rasterise the scene. As such much of this data can be removed thereby freeing its memory resource for other objects.

This can be achieved by performing a rasterisation pass on the tiled data that removes all objects that do not contribute to the final 3D scene. As this pass is not required to generate an image it only needs to rasterise the depth and stencil data for the scene making it considerably faster than a "full" render. Further to this, as the retained object data is then guaranteed to correctly render the final image no additional external storage is required for depth and frame buffer images. This pass can be referred to as a "Parameter compaction" pass.

The parameter compaction pass works by building up a buffer of 'tags' for the frontmost visible objects for each pixel within the scene. The contents of this buffer are considered to be required for the final scene under the following conditions,
 1. All objects in the tile/scene have been rasterised,
 2. A pass needs to be spawned to the texture and shading unit
 3. The stencil buffer has been updated
 4. The depth buffer has been updated and the object that caused the updating does not modify the 'tag' buffer.

When it has been decided that the contents of the tag buffer are required they are processed to regenerate the tile based object list for only those objects required to correctly render the scene and to mark memory blocks for those objects as still referenced. In cases 3 and 4 above, after the buffer has been processed the object that caused the flush to the texture and shading unit must itself be processed. In case 3 this will include the object itself, even if it has been determined to not be visible.

Given that objects that update the stencil buffer can cause a relatively large number of objects to be retained it may be preferable to store the stencil buffer state itself. This allows the objects that update the stencil buffer image to be discarded and avoids the need to flush other valid objects at this time. The stencil buffer image needs to be saved at the point any object updates either depth or tag buffers. Based on its state, the memory for the saved stencil image is allocated using the same parameter memory management mechanism as is used for parameters. The same mechanism could be applied to depth only update objects, however these tend to be much fewer in number than stencil update objects and so do not tend to consume a large quantity of memory.

This mechanism can be combined with macro tiling to allow macro tiles that have consumed memory to be 'compacted' i.e. to free memory when the system is running out of memory, without incurring the disadvantages described above. Further to this, as macro tiling allocates memory to objects that i.e. in a locality of tiles the likelihood of a memory block successfully being freed by a parameter compaction pass is significantly increased. As memory is freed block by block the scheme avoids the need to re-shuffle data in order to retrieve space, but does have the disadvantage of requiring all references to a block to be removed before it can be freed. The amount of memory freed could be improved by managing memory with a smaller granularity than this such as per tile or even per object in order to maximise the system's ability to free unneeded object data memory.

Alternatively it is possible to retain a coarse granularity block based scheme and conditionally apply a more aggressive compaction algorithm. For example, if the system sees a large number of object pointers being removed from the tiled geometry lists but only a small reduction in the number of memory blocks used it could then apply a second compaction pass to the macro tile. This second pass could compact object data by moving it in memory such that any free space becomes contiguous allowing it to be freed. It is likely that this form of compaction would only be required in extreme circumstance so could be done by software.

The invention is defined with more precision in the appended claims to which reference should now be made.

BRIEF DESCRIPTION OF THE DRAWINGS

Preferred embodiments of the invention will now be described in detail by way of example with reference to the accompanying drawings in which.

DETAILED DESCRIPTION OF PREFERRED EMBODIMENT

It should be noted that the described embodiment makes the following assumptions about the manner in which memory is managed, Memory for object pointers is allocated from separate memory blocks to object data.

Pointer memory blocks are allocated per tile as apposed to per macro tile.

Figure 1:
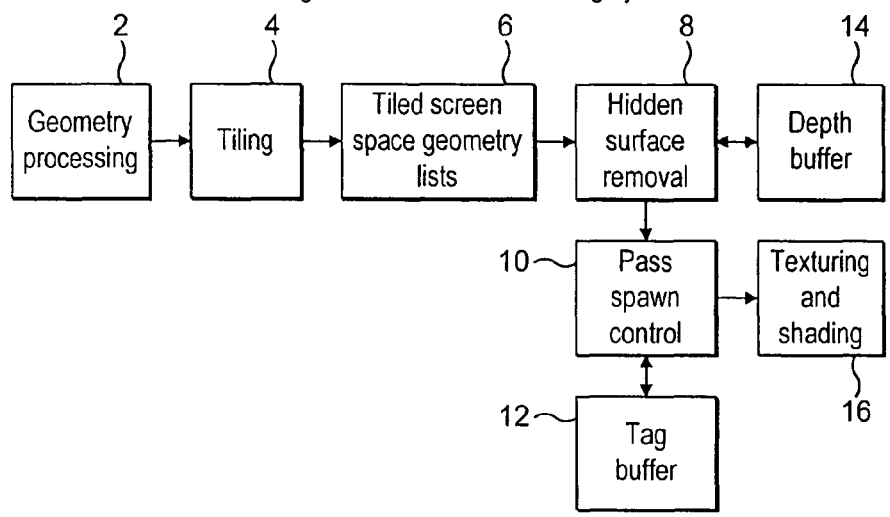
FIG. 1 shows a block diagram of a prior art tile based rendering system discussed above.
Figure 2:
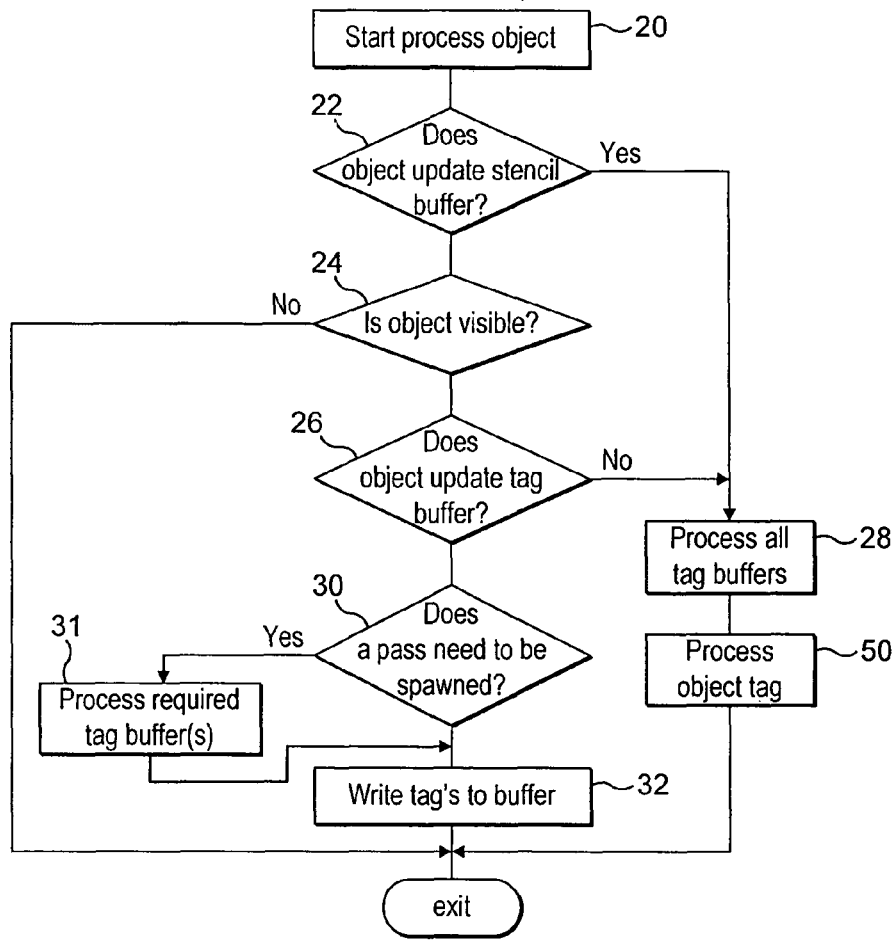
FIG. 2 shows a flow chart of how an embodiment of the invention determines if an object should be retained.

FIG. 2 illustrates the basic algorithm used to determine if an object is required and when the tag buffer should be processed. At 22 a determination is made as whether or not the object updates the stencil buffer, if it does, based on rule 3 above, then all tag buffers are processed at 28 and the object itself is processed at 50 before exiting.

If the object does not update the stencil buffer then the visibility of the object is determined at 24, if the object is not visible the algorithm exits. If the object is visible then it is determined at 26 if the object updates the tag buffer, if it does not then, in accordance with rule 4 above all tag buffers are processed at 28 and the object itself is processed at 50 before exiting.

If the object does update the tag buffer then it is determined at 30 as to whether a pass needs to be spawned (see patent, pass spawning, ref 46009.GB1), if so then based on rule 2 above, the tag buffers are processed as per the requirements of pass spawning at 31 and the object tags are then written to the tag buffer at 32 and the algorithm then exits.

Figure 3:
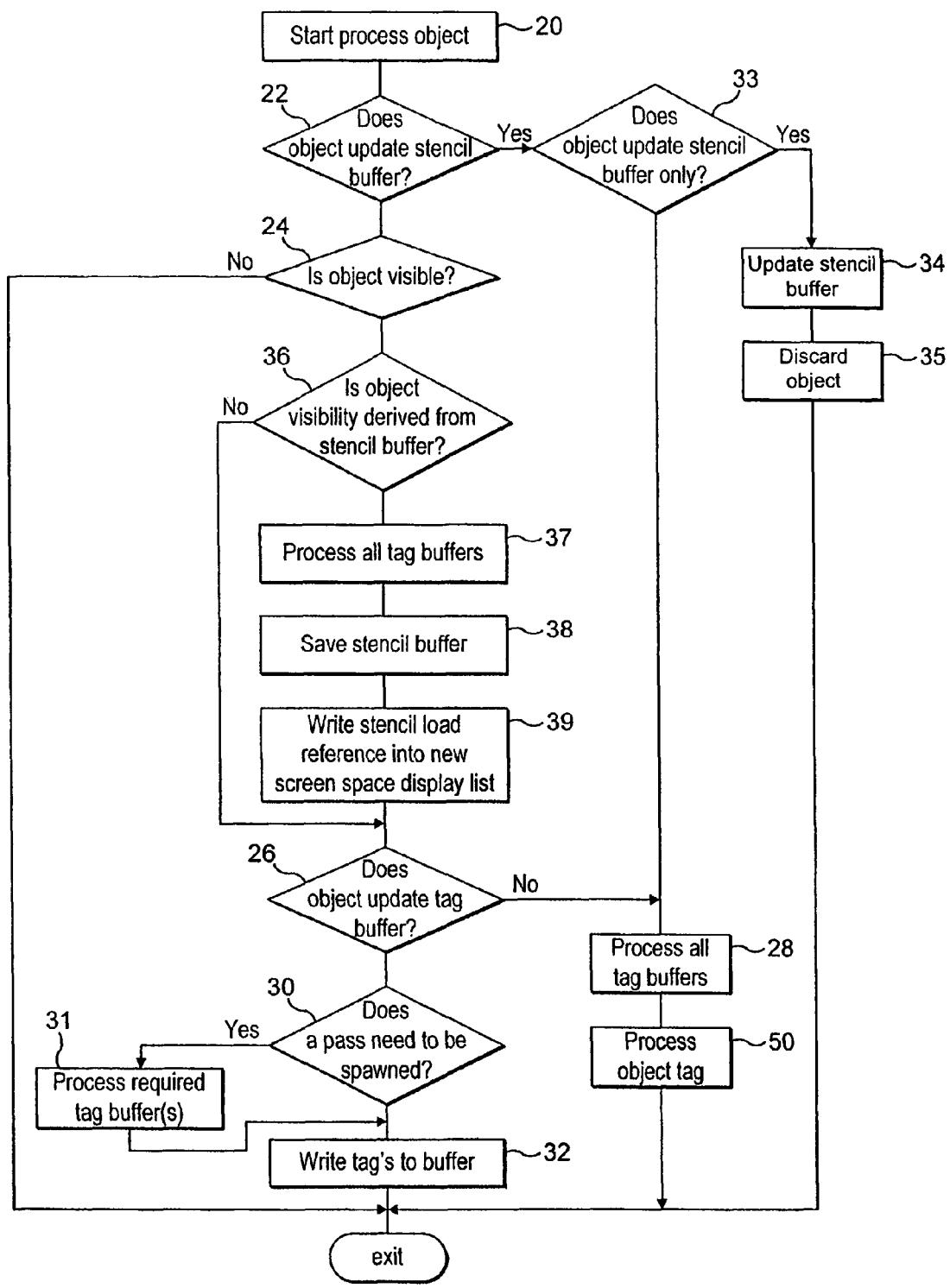
FIG. 3 shows a modification to the algorithm shown in FIG. 2.

FIG. 3 illustrates the basic algorithm defined above with the addition of stencil objects replaced with stencil buffer load/store, as described in the summary section. At 22 a test is made to see if the object updates the stencil buffer as per FIG. 2, however after this an additional test is made at 33 to determine if it is only the stencil buffer that is updated, if not the algorithm proceeds in FIG. 2. Otherwise the object just updates the stencil buffer and is then discarded. As in FIG. 2 object visibility is tested at 24, however this is followed by an additional test at 36 to determine if the object visibility was dependent on the contents of the stencil buffer. If so then the current tag buffers are processed at 37 and the stencil buffer for the tile stored to memory at 38. A 'load stencil' object is then inserted into the per tile geometry lists at 39. The algorithm then proceeds as in FIG. 2.

Figure 4:
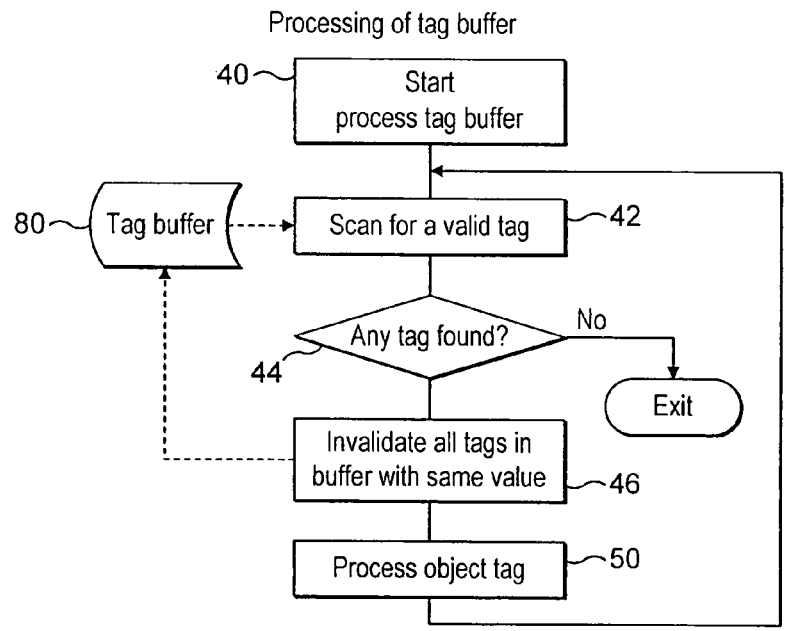
FIG. 4 shows how an object tag buffer is processed once it has been determined that its contents are required for the final scene.

FIG. 4 illustrates the manner in which a tag buffer is processed. After the start of the process 40 the tag buffer 80 is scanned for a valid tag at 42, if no valid tag is found the process exits at 44. Otherwise, at 46 all tags within the tag buffer with the same tag value as found at 42 are invalidated. This action is required as the tag buffer represents pixels of which any single object may cover many, so in order to prevent an object being repeatedly inserted into the tile geometry list all instances of a tag must be invalidated the first time it is found. The object tag is then processed at 50 before returning to 42 to scan for the next valid tag.

Figure 5:
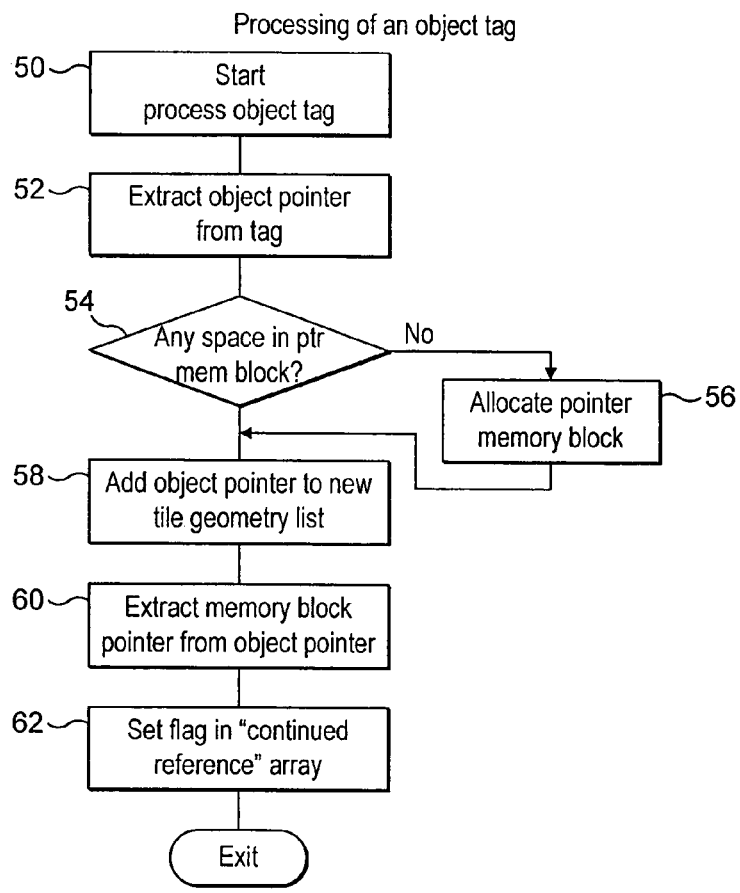
FIG. 5 shows how an individual object tag is processed once it has been extracted from a tag buffer.

When an object tag is processed two operations are performed. First each tag is used to regenerate an object list pointer that is then inserted into a new object list for the tile. Secondly a flag is set for each memory block that is referenced by a tag to indicate that the memory block is still required. This process is illustrated in FIG. 5.

At 52 a pointer to the object is extracted from the object tag. At 54 it is then determined if there is space in the current tile object pointer block, if not then a new memory block is allocated at 56. The pointer to the object is then added back into the tile list at 58. A pointer to the memory block containing the object is the extracted at 60 and used to flag the blocks continued use in a "continued reference" array at 62 before exiting.

Figure 6:
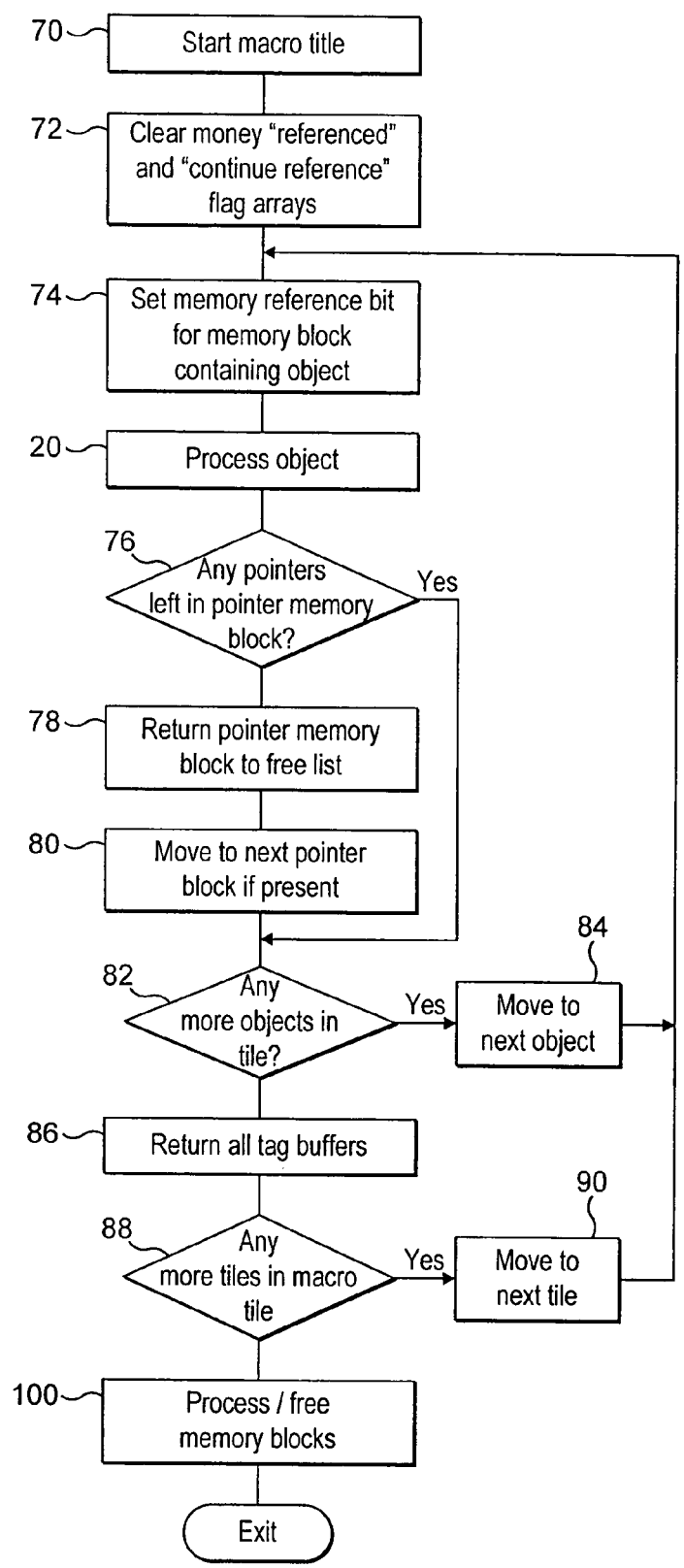
FIG. 6 shows how a whole macro tile is processed.

The processing of a whole macro tile is illustrated by FIG. 6. At the start of processing each macro tile's array of flags indicating if an object is currently 'referenced' and if a block should continue to be referenced (referred to as the 'continued reference' array) are cleared at 72. For each object a 'referenced' flag is set at 74 to indicate that the memory block is referenced in this macro tile. Each object is then processed at 20 as described above. At 76 a test is made to see if there are any more object pointers in the current pointer memory block, if not the current block is returned to the free list at 78 and the process moves to the next block if one is present at 80. A test is then made at 82 to determine if there are any more objects to be processed in the tile, if so the process moves to the next object at 84 and then returns to 74. If there are no more objects in the tile all tag buffers are processed as defined above (process 40, 'Start Process Tag Buffer'). The process then checks if there are any more tiles to be processed in the macro tile at 88. If there are then moving to the next tile at 90 before returning to 74. When all tiles in the macro tile have been processed the object memory is processed at 100.

Figure 7:
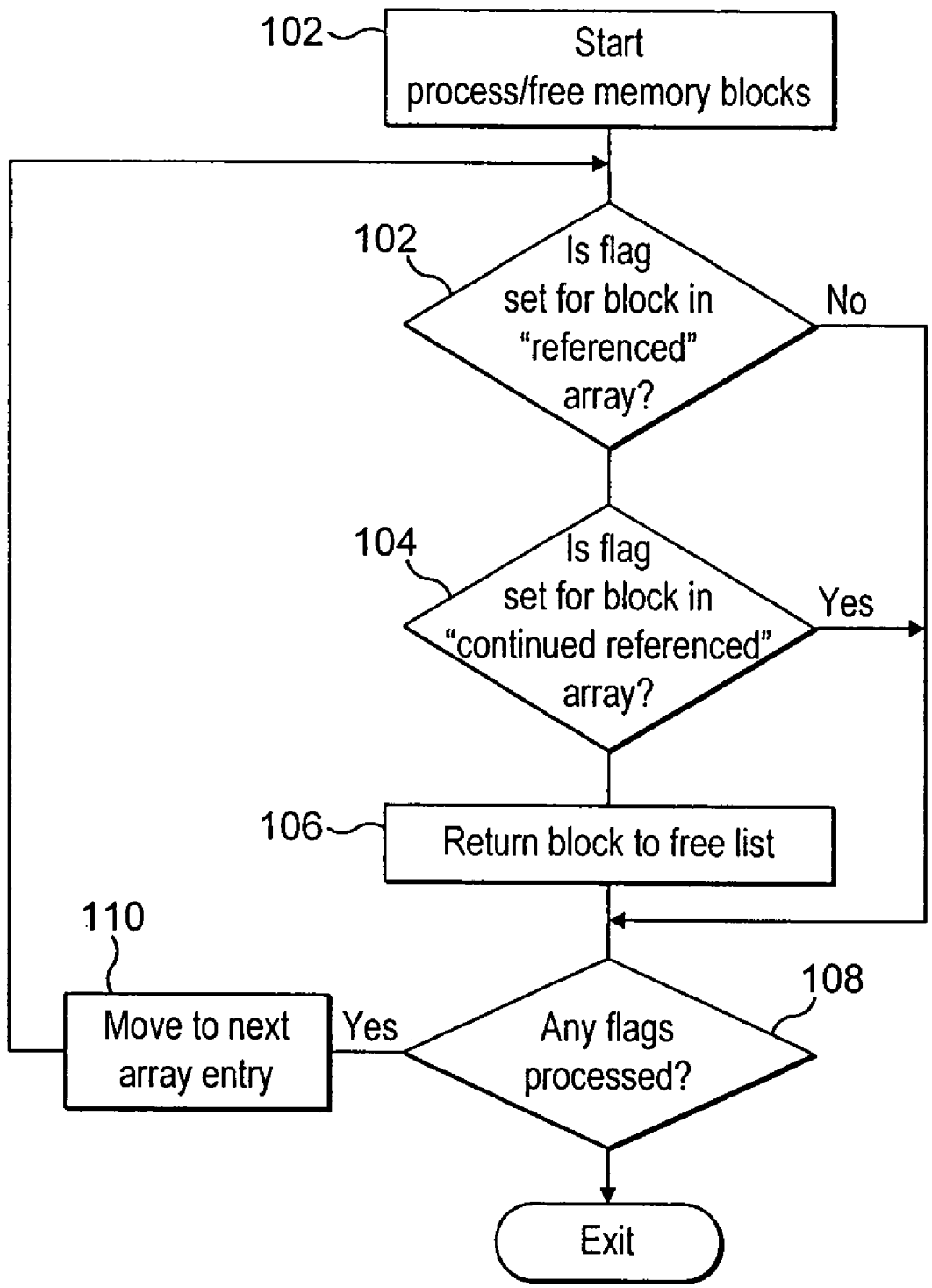
FIG. 7 shows how memory is processed/freed at the end of each macro tile.

When all tiles in a macro tile have been processed the memory block's 'referenced', and 'continued reference' flag arrays are processed to determine which memory blocks can be freed. This process is illustrated by FIG. 7.

For each memory block in the system the flag from the referenced array is first checked at 102. If it is not set then the process moves to the test at 108. Otherwise the continued reference array flag is tested at 104. If the continued referenced flag is not set then the memory block is returned to the list of free blocks at 106. Otherwise it continues to be required by the scene and the process moves onto the next entry at 108 and 110 as necessary.

Figure 8:
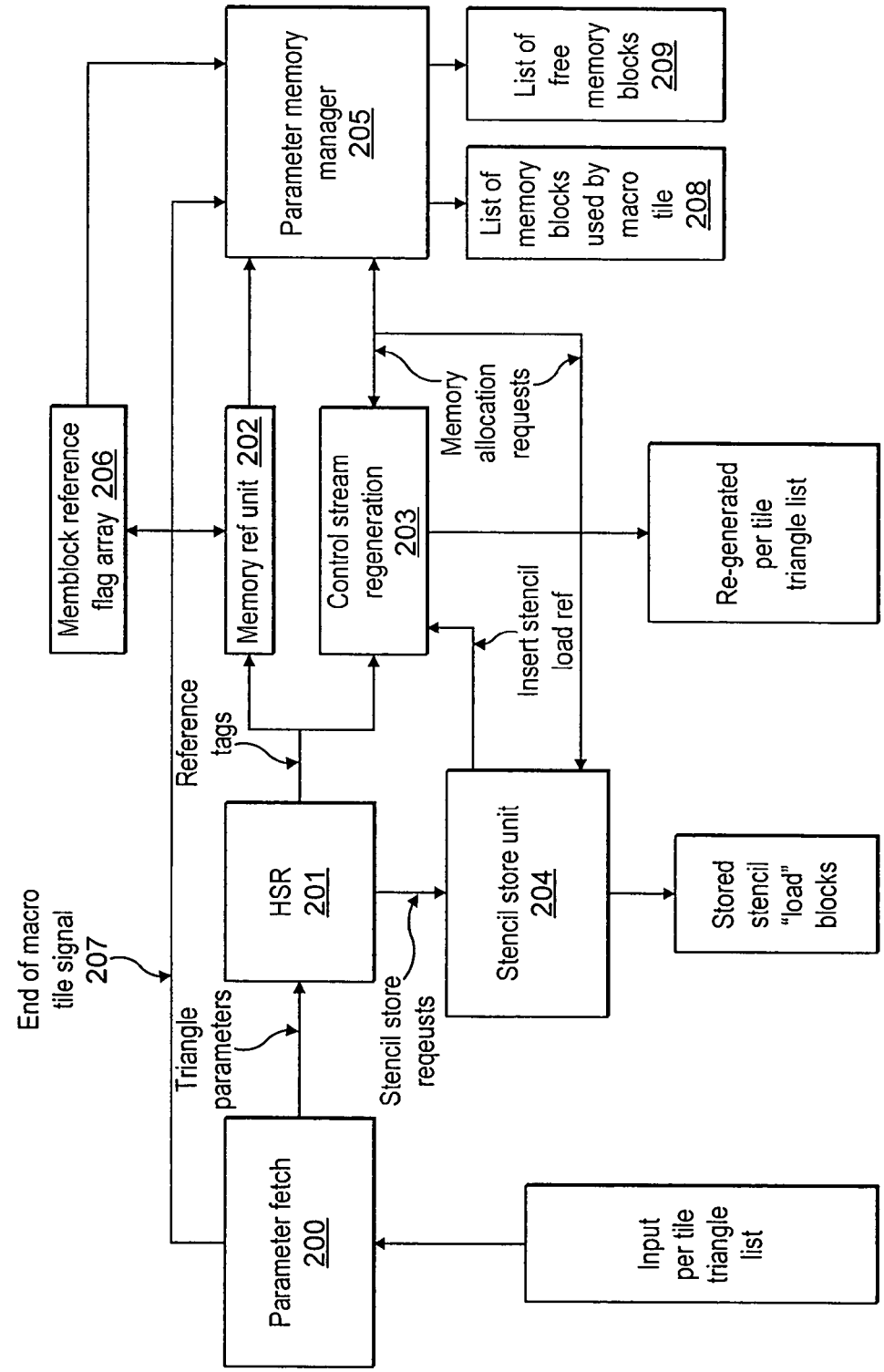
FIG. 8 is a block diagram of an embodiment of the invention.

FIG. 8 shows a block diagram of the preferred embodiment. A parameter fetch unit (200) reads the input per tile parameter lists and feeds them to an hidden surface removal (HSR) unit (201) that determines which objects need to be retained or which stencil data needs to be stored in order to rasterise the scene correctly, as described in the previous section. The HSR unit passes referenced memory block pointers to memory reference unit (202). This sets a flag for each referenced block in the reference array (206). The HSR unit also passes the tags for the required objects to a control stream regenerator unit (203), which rebuilds valid lists of objects, using newly allocated memory blocks (requested from the memory manager (205)). If the HSR unit determines that the stencil state should be stored then it passes the stencil data to the Stencil Store unit (204) which will allocate memory for a tile's worth of stencil buffer, store the stencil data to memory and ask the control stream regenerator to insert a stencil load reference into the per tile object list. When a parameter fetch unit (207) signals to a parameter memory management unit (205) that all parameters have been processed for the macro tile it scans the list of memory blocks previously used by the macro tile (208) and returns any that are no longer flagged as required to the list of free blocks (209) as described in FIG. 7.

The above will be started by the device driver software for one macro tile at a time whenever the system runs out of parameter memory.

The invention claimed is:

1. A method for managing memory usage in a three-dimensional computer graphics system, the method comprising the steps of:
    dividing a scene to be textured and shaded into a plurality of rectangular areas, each area comprising a plurality of picture elements in the scene;
    deriving a list of objects for each rectangular area, each list comprising objects which may be visible in the scene;
    removing from each list all objects that do not contribute to the final textured and shaded scene;
    determining depth and stencil data for each object in the scene;
    compiling a buffer of tags for the frontmost visible object for each pixel within the scene;
    reducing the list of objects to be rendered by using the depth and stencil data for hidden surface removal in combination with the buffer of tags; and
    texturing and shading each rectangular area using the reduced lists of objects for each rectangular area, wherein the removing step comprises the step of processing the buffer of the tags to regenerate the object list for each tile for only those objects required to correctly render the scene, the object list being subsequently rendered in the texturing and shading step.

2. The method according to claim 1, wherein the removing step comprises the step of regenerating the list using the data stored in the tag buffer.

3. The method according to claim 1, wherein a determination is made whenever an object does not update the tag buffer as to whether or not the scene should be textured and shaded.

4. The method according to claim 1, wherein the method operates on one rectangular area at a time.

5. The method according to claim 1, wherein the method operates on the plurality of rectangular areas forming a macro area, each macro area being smaller than the area of the whole scene.

6. The method according to claim 1, wherein the regenerating step includes the steps of generating a pointer to insert into a new object list for the rectangular area, and setting a flag for each memory location that is referenced by a tag.

7. The method according to claim 1 further including the step of compacting memory allocated to rectangular areas to free unused memory.

8. An apparatus for managing memory usage in a three-dimensional computer graphics system comprising:
    means for dividing a scene to be textured and shaded into a plurality of rectangular areas, each area comprising a plurality of picture elements in the scene;
    means for deriving a list of objects for each rectangular area, each list comprising objects which may be visible in the scene;
    means for removing from each list all objects that do not contribute to the final textured and shaded;
    means for determining depth and stencil data for each object in the scene;
    means for compiling a buffer of tags for the frontmost visible object for each pixel within the scene;
    means for reducing the list of objects to be rendered by using the depth and stencil data for hidden surface removal in combination with the buffer of tags; and
    means for texturing and shading each rectangular area using the reduced lists of objects for each rectangular area, wherein the removing means comprises means for processing the buffer of the tags to regenerate the object list for each tile for only those objects required to correctly render the scene, the object list being subsequently rendered in the texturing and shading means.

9. An apparatus according to claim 8, wherein the regenerating means includes means for generating a pointer to insert into a new object list for the rectangular area, and means for setting a flag for each memory location that is referenced by a tag.

* * * * *